(12) United States Patent
Aldinio Colbachini

(10) Patent No.: US 8,083,981 B2
(45) Date of Patent: Dec. 27, 2011

(54) METHOD FOR MAKING A SHAPED FLEXIBLE TUBE

(75) Inventor: Giuseppe Aldinio Colbachini, Padua (IT)

(73) Assignee: IVG Colbachini S.p.A., Cervarese Santa Croce (Padova) (IT)

( * ) Notice: Subject to any disclaimer, the term of this patent is extended or adjusted under 35 U.S.C. 154(b) by 706 days.

(21) Appl. No.: 11/973,760

(22) Filed: Oct. 10, 2007

(65) Prior Publication Data
US 2008/0069984 A1 Mar. 20, 2008

(30) Foreign Application Priority Data
Nov. 8, 2006 (IT) .............................. MI2006A2141

(51) Int. Cl.
| | | |
|---|---|---|
| *B29C 53/00* | (2006.01) |
| *B29C 55/00* | (2006.01) |
| *B29C 71/00* | (2006.01) |
| *B29C 45/00* | (2006.01) |
| *B29C 39/00* | (2006.01) |
| *B29C 41/00* | (2006.01) |
| *B29B 17/00* | (2006.01) |
| *B28B 7/30* | (2006.01) |
| *B28B 1/14* | (2006.01) |

(52) U.S. Cl. ........ 264/295; 264/339; 264/347; 264/313; 264/299

(58) Field of Classification Search ........................ None
See application file for complete search history.

(56) References Cited

U.S. PATENT DOCUMENTS
4,106,968 A * 8/1978 Kutnyak et al. ............... 156/189
4,804,019 A * 2/1989 Kramer, Jr. .................... 138/109
5,424,015 A * 6/1995 Matsuda et al. .............. 264/130

* cited by examiner

*Primary Examiner* — Christina Johnson
*Assistant Examiner* — Benjamin Schiffman
(74) *Attorney, Agent, or Firm* — Hedman & Costigan, P.C.; Kathleen A. Costigan

(57) ABSTRACT

A flexible tube comprises a tubular body made of a curable flexible material, having at least an elbow shape, and made by a double curing, the first on a straight mandrel, and the second on a shaped cylindric core, to provide the tube with a desired configuration.

With respect to the conventional art in this field, the invention provides the advantage that the shaped tube made thereby is directly provided, at the end portion thereof, with the required fittings, without the need of performing auxiliary processing steps to clamp the fittings.

2 Claims, 11 Drawing Sheets

METHOD FOR MAKING A SHAPED FLEXIBLE TUBE

BACKGROUND OF THE INVENTION

The present invention relates to a novel method for making shaped flexible tubes or hoses, in particular curved flexible tubes.

The invention also relates to the shaped flexible tube made by the inventive method.

The field of the invention is that of the methods used for making shaped flexible tubes in general, in particular tubes including either one or more bent portions, and which are made of a curable material.

At present, the flexible tubes of the above mentioned type, made of a flexible elastomeric curable material, such as rubber and the like, as they are industrially made by a method different from a straight mandrel method, have free end portions thereof, that is end portions which are lacking of possible fittings or "rubber heel members", made as a single piece, and which are usually necessary for coupling the tube to target utilizer devices.

Thus, conventional curved tubes having the above disclosed construction require auxiliary clamping operations, for clamping the desired fittings which, accordingly, are not structurally joined or integral with the body of the tube.

Thus, prior tubes of the above disclosed pipes are affected by drawbacks, related to the mentioned requirements of performing auxiliary processing operations on said tubes, and due to the further requirement of using auxiliary elements such as clamping bands, ring-nuts and the like.

To overcome the above mentioned drawbacks, it is known in the art to make flexible pipes or hoses on a straight mandrel, the pipes being held in a desired curved or bent position by a metal coil insert, operating to receive and hold the desired shape of the tube.

Such an approach, however, has the drawback of requiring an additional provision of a metal coil or spiral element to be built-in or embedded in the pipe construction; such a coil element, actually, is sometimes undesirable, since such a coil or spiral element would negatively affect the end weight of the tube and its making costs.

SUMMARY OF THE INVENTION

Accordingly, the main object of the present invention is to provide a novel method for making shaped flexible tubes or hoses, which, with respect to prior hose or tube making methods, allows to include the end required fittings at the end of the tube, directly as the latter is made.

A further object of the present invention is to provide such a shaped flexible tube which comprises tube fittings made as a single-piece at the ends of the tube.

The above mentioned objects, as well as yet other objects, are achieved by a method for making a flexible tube, and a tube made thereby, respectively according to claims 1 and 4.

Preferred embodiments of the invention being defined in the remaining claims.

With respect to conventional flexible tube making methods, the inventive method provides the advantage of making a shaped flexible tube which is already provided, at the end portions thereof, with the required tube fittings, and this without the need of performing auxiliary processing operations for clamping the tube fittings to the tube body.

Another advantage of the invention is that the inventive shaped tube is made on a straight mandrel, that is by a method which, at present, provides an end product of a very high quality.

BRIEF DESCRIPTION OF THE DRAWINGS

The above mentioned objects, as well as yet other objects, advantages and characteristics of the invention will become more apparent hereinafter from the following disclosure of a preferred embodiment of a method for making a flexible tube according to the invention, and a tube made thereby, which are hereinafter disclosed with reference to the figures of the accompanying drawings, given only by way of a non limitative example.

In the drawings.

DESCRIPTION OF THE PREFERRED EMBODIMENTS

Figure 7:
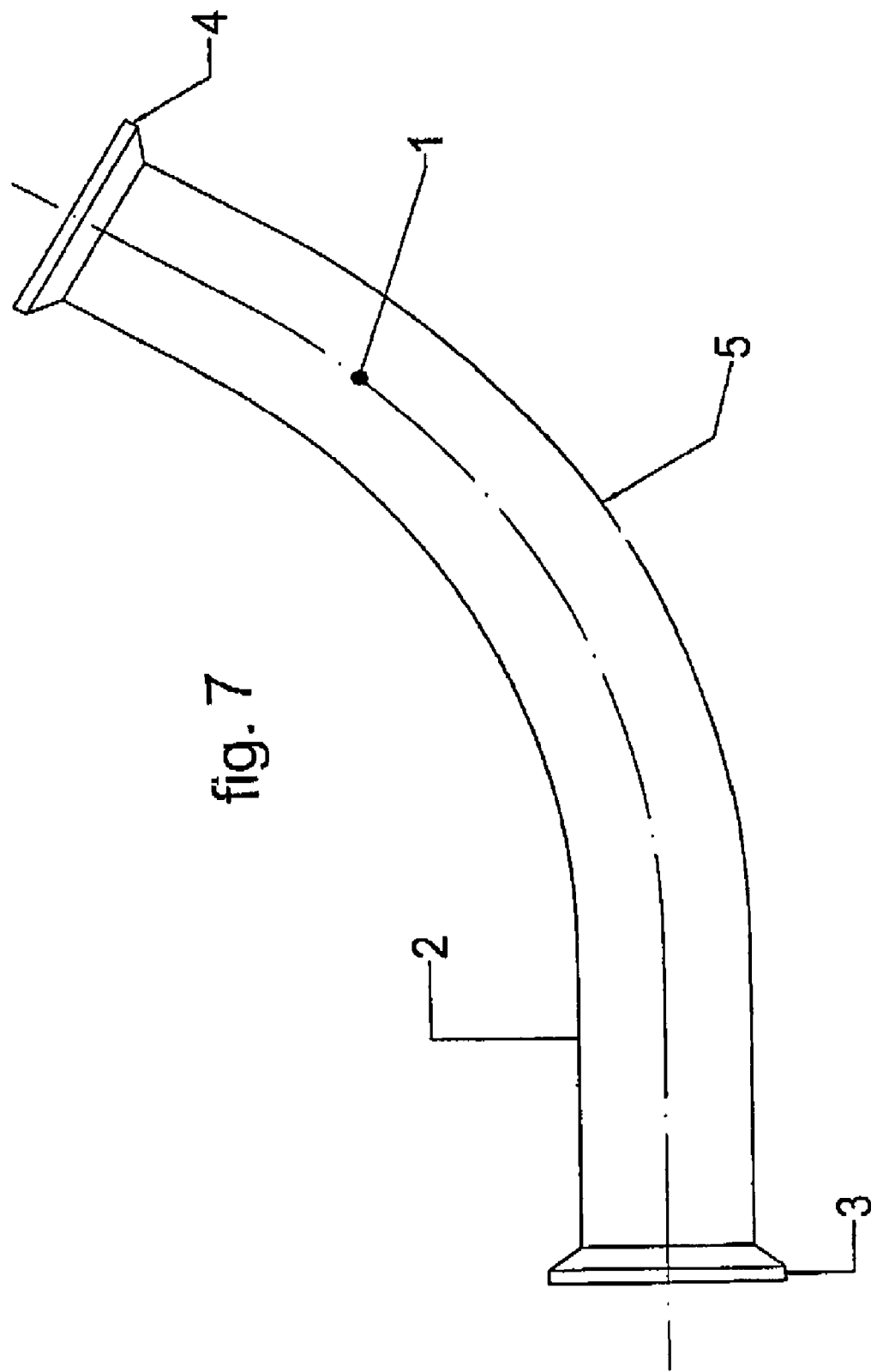
FIG. 7 shows an exemplary embodiment of the tube made by the method shown in the preceding figures.
Figure 8:
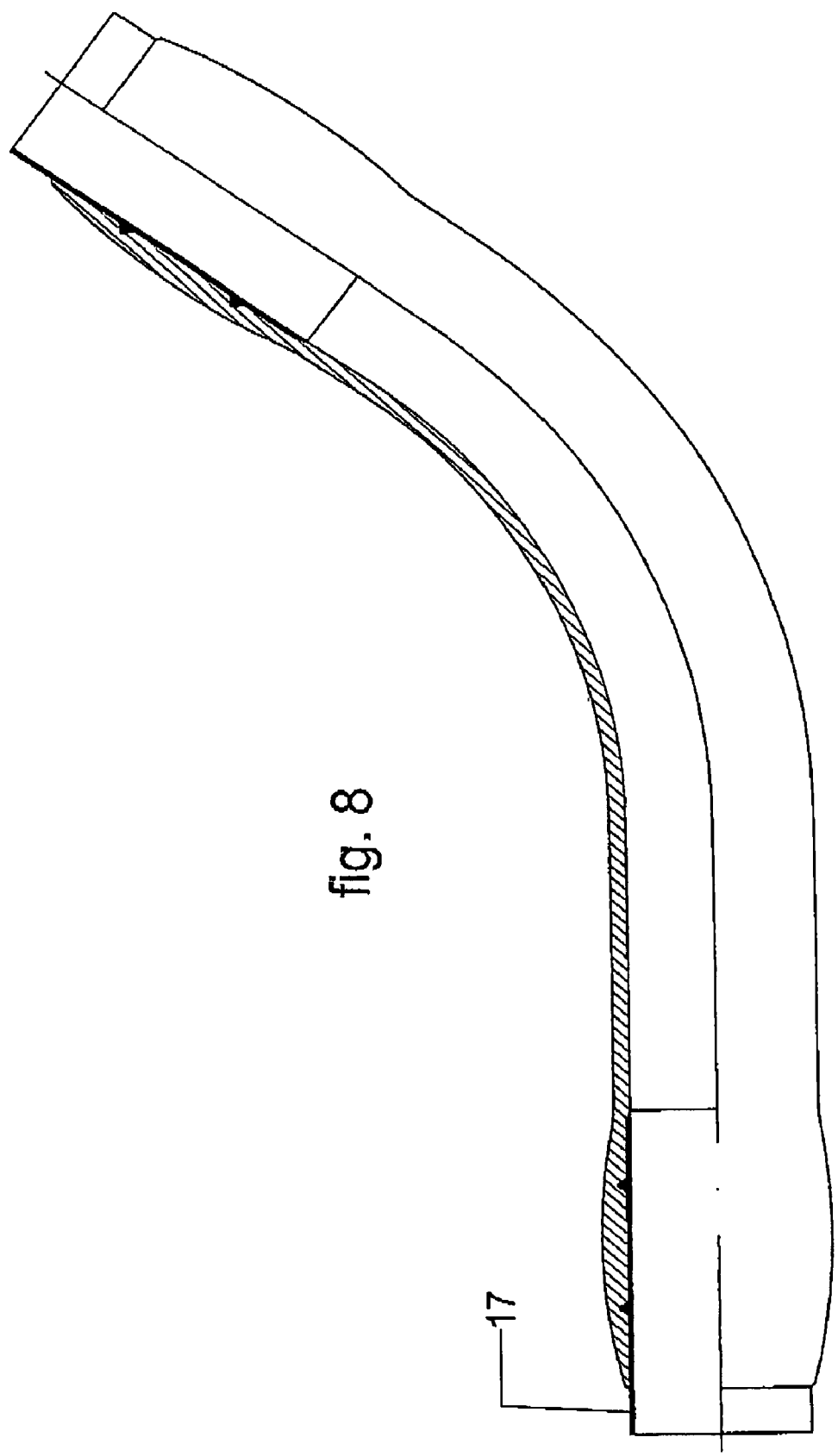
FIGS. 8 to 11 are cross-sectional views showing some exemplary embodiments of the flexible tube made by the method according to the invention.

The flexible tube or hose according to the present invention has been generally indicated in the FIG. 7 by the reference number 1.

Said flexible tube comprises a tubular body 2, made of a flexible cured material, having connection end portions 3, 4 and curved at a tube elbow 5.

Figure 1:
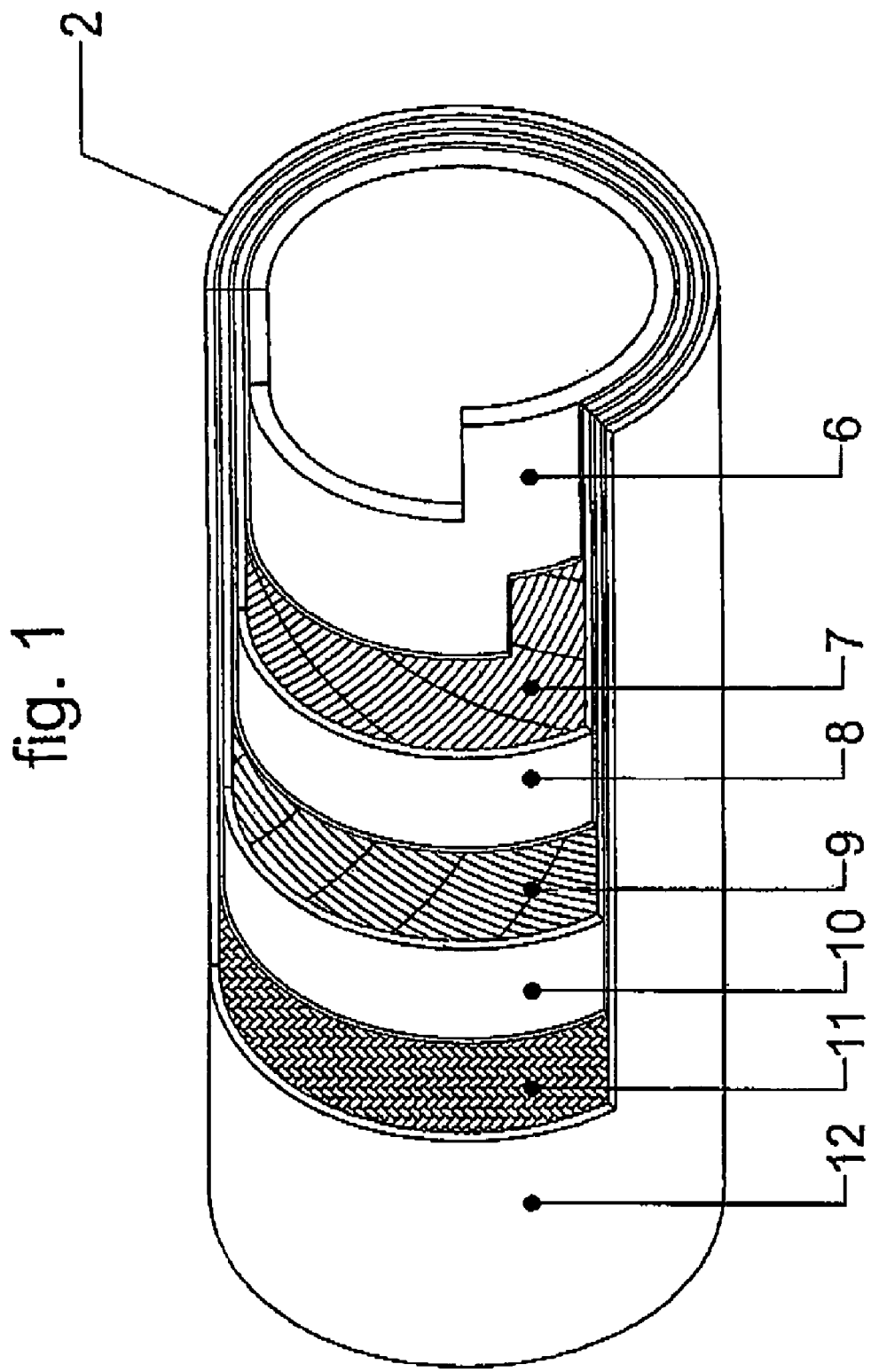
FIG. 1 is a broken-away view showing the construction of a flexible tube according to the present invention.

More specifically, as clearly shown in FIG. 1, the tubular body 2 of the inventive flexible tube comprises a first inner rubber layer 6 (a flexible curable material), thereon are applied or coated, or overlapped, in succession and by a straight mandrel making method, a layer 7 made of a pressure resistant fabric material, a rubber layer 8, a further fabric layer 9 similar to the layer 7, a further rubber layer 10, yet another layer 11 of a material adapted to resist against high temperatures, and an outer covering layer 12 made of rubber or other suitable materials.

Figure 2:
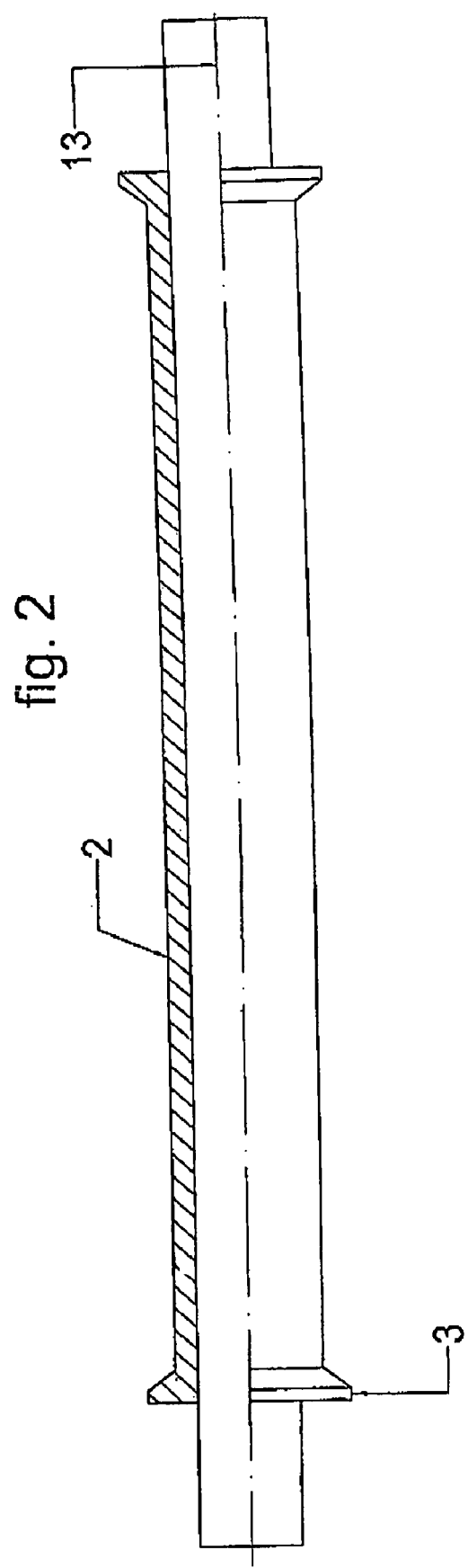
FIG. 2 shows the tube of FIG. 1, made on a straight mandrel and including integral fitting end portions.
Figure 3:
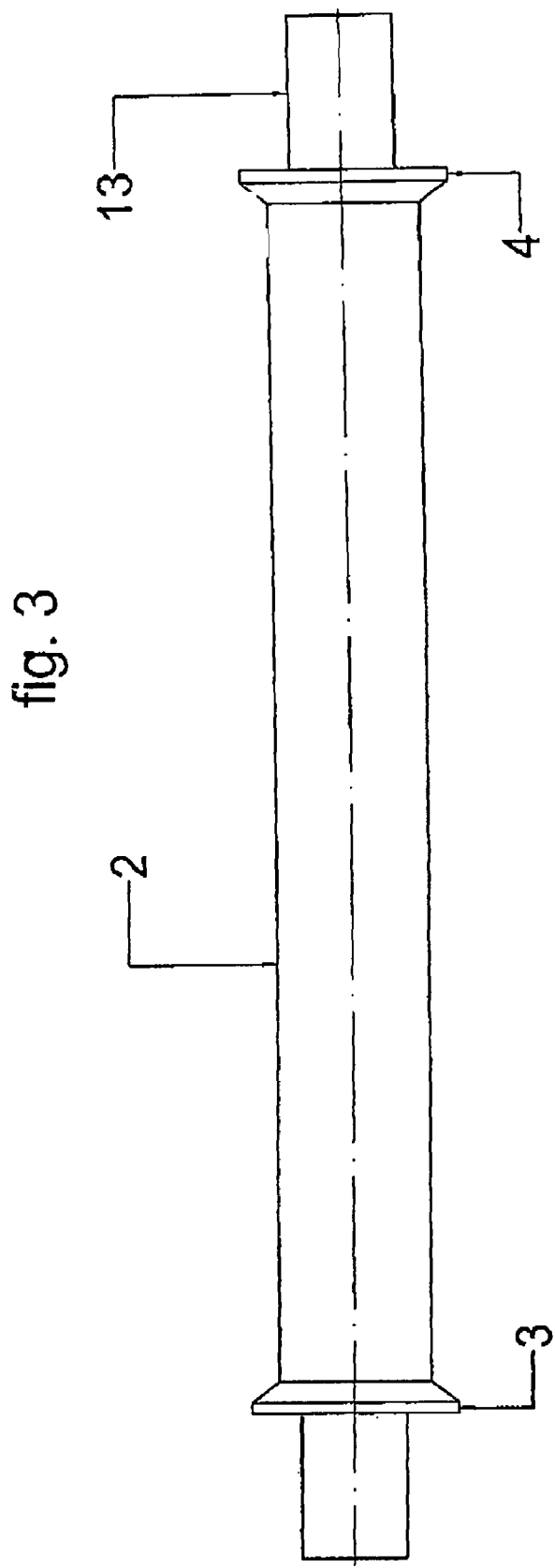
FIGS. 3 to 6 show the operating steps of the method for making the tube of FIG. 1.

At the start of the making of the tube 1, as is shown in FIGS. 2 and 3, the tubular body 2 is formed on a straight mandrel 13, with an integral making of fitting ends 3, 5 at the corresponding end portions of the tubular body 2.

Figure 4:
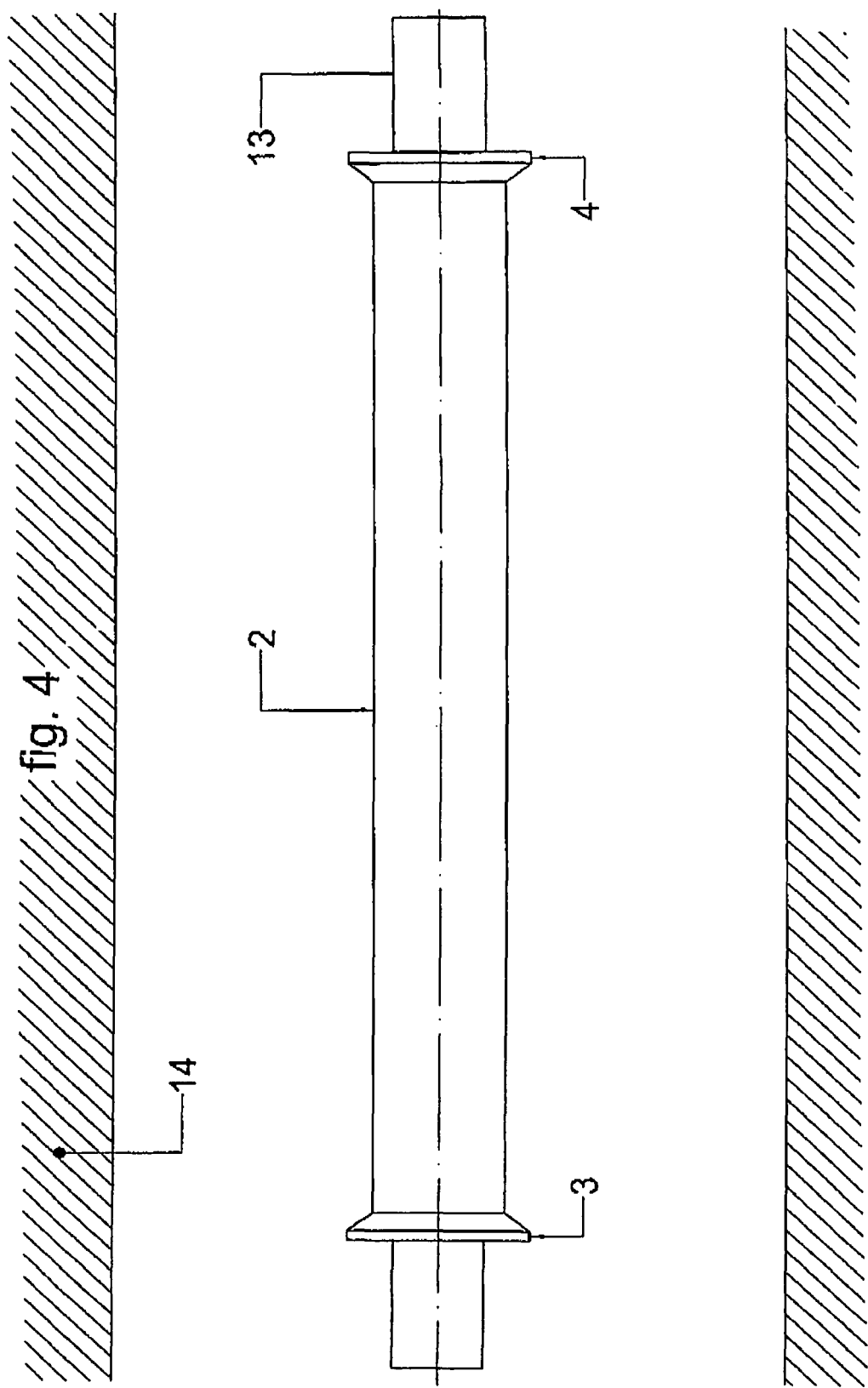
Figure 5:
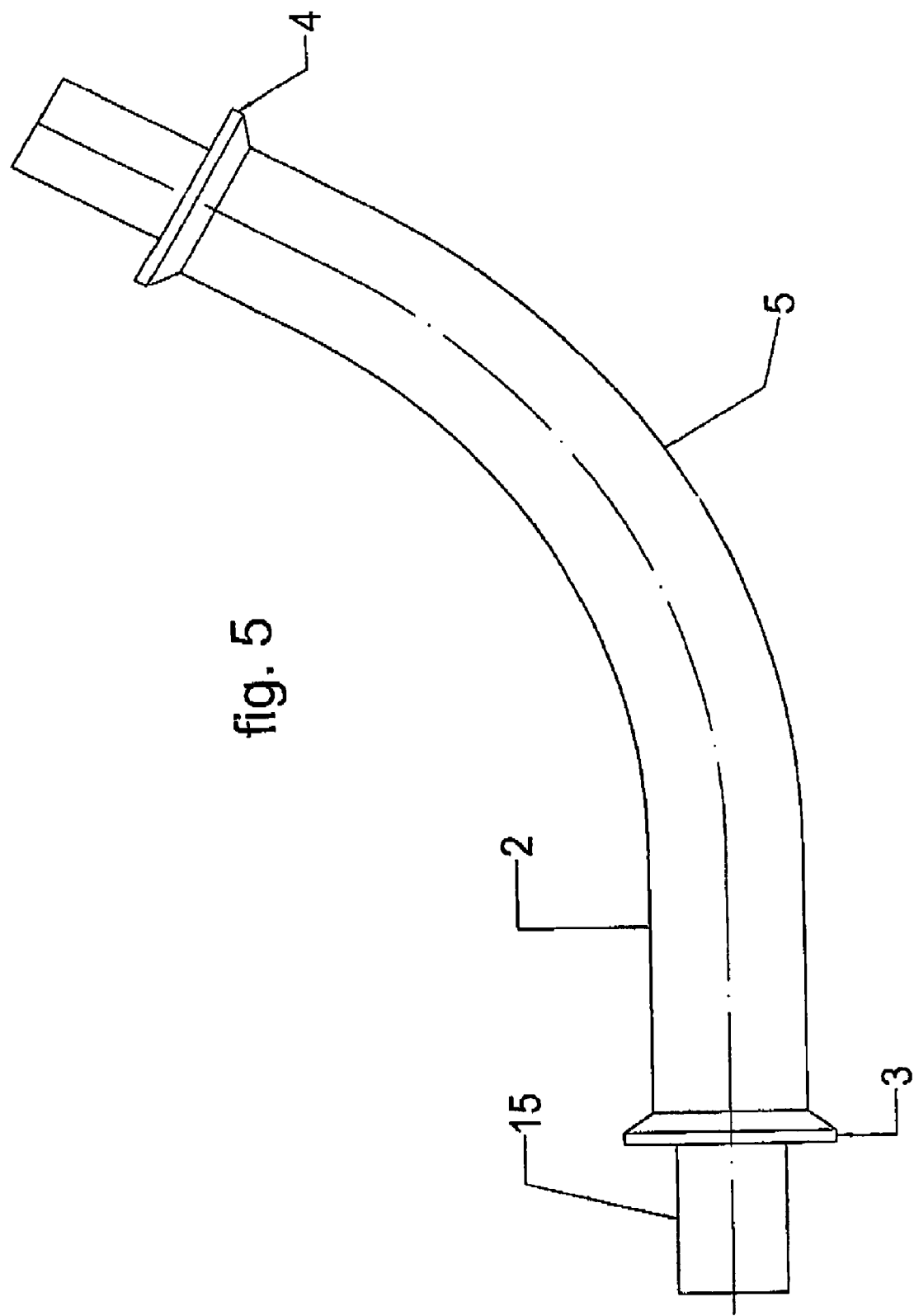
Figure 6:
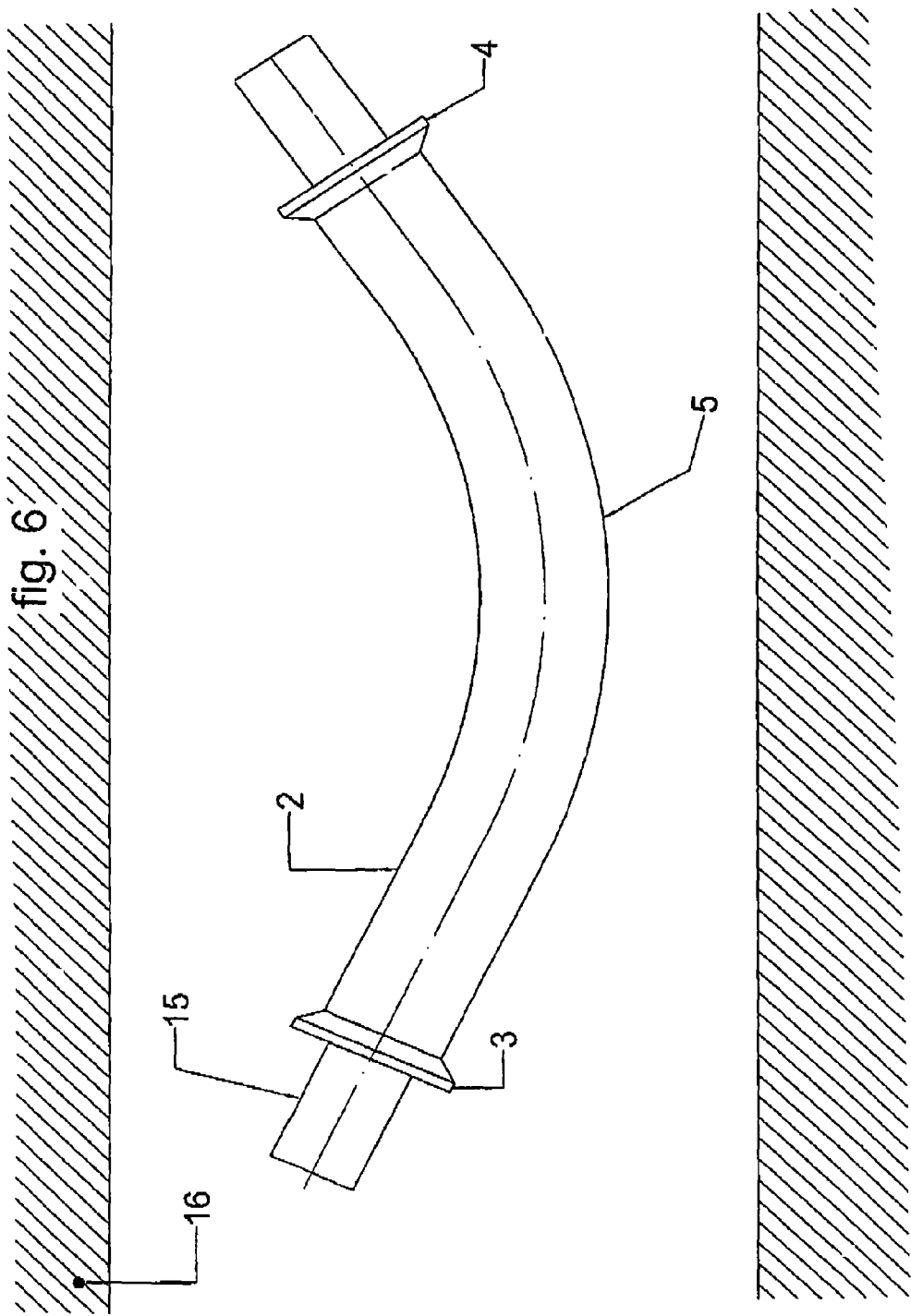

The thus made tube is then subjected to a curing operation, for a first time, in a curing oven 14 (FIG. 4).

At the outlet of the curing oven 14 a rectilinear flexible tube is thus obtained, which is then assembled on a curved cylindric core element 15, designed for providing the tube with the shape of the above mentioned elbow 5.

The core element or assembly 15, with the tube engaged therein, is then caused to pass through a further oven 16, which will perform a second curing step on the tube already cured in the curing oven 14, thereby permanently providing the tube 1 with its bent or curved end shape, as shown in FIG. 7.

At the end of the above mentioned operation, the flexible tube 1 is withdrawn or separated from said core element 15.

Thus, by the inventive method, the shaped flexible tube 1 of FIG. 7 can be made by a straight mandrel tube making method, with an integrated curing step for curing the tube on a curved or bent core element, thereby simultaneously providing both a tube having the desired shape, and integral fitting elements, in a single piece with the tube body, at the end portions of the tube body.

In particular, in the embodiments shown in FIGS. 8 to 11, in the end portions of the shaped flexible tube 1 are respectively embedded or built-in, an end-piece 17, made of a steel material, a flange 18 with a rubber core (coated cured fitting element), a further rubber flange 19, and yet another flange 20 (cured fitting element).

The method according to the invention will be disclosed hereinafter with reference to some exemplary embodiments thereof, which are herein shown only by way of indicate examples, without limiting the scope of the invention.

Example 1

The Tube of FIG. 7
design size of the straight mandrel 13: diameter 100 mm:
fitting end 3,4: "rubber heel elements";
design size of the curved or bent core 15: diameter 100 mm; bending radius 400 mm; angle 45°.

Example 2

Figure 9:
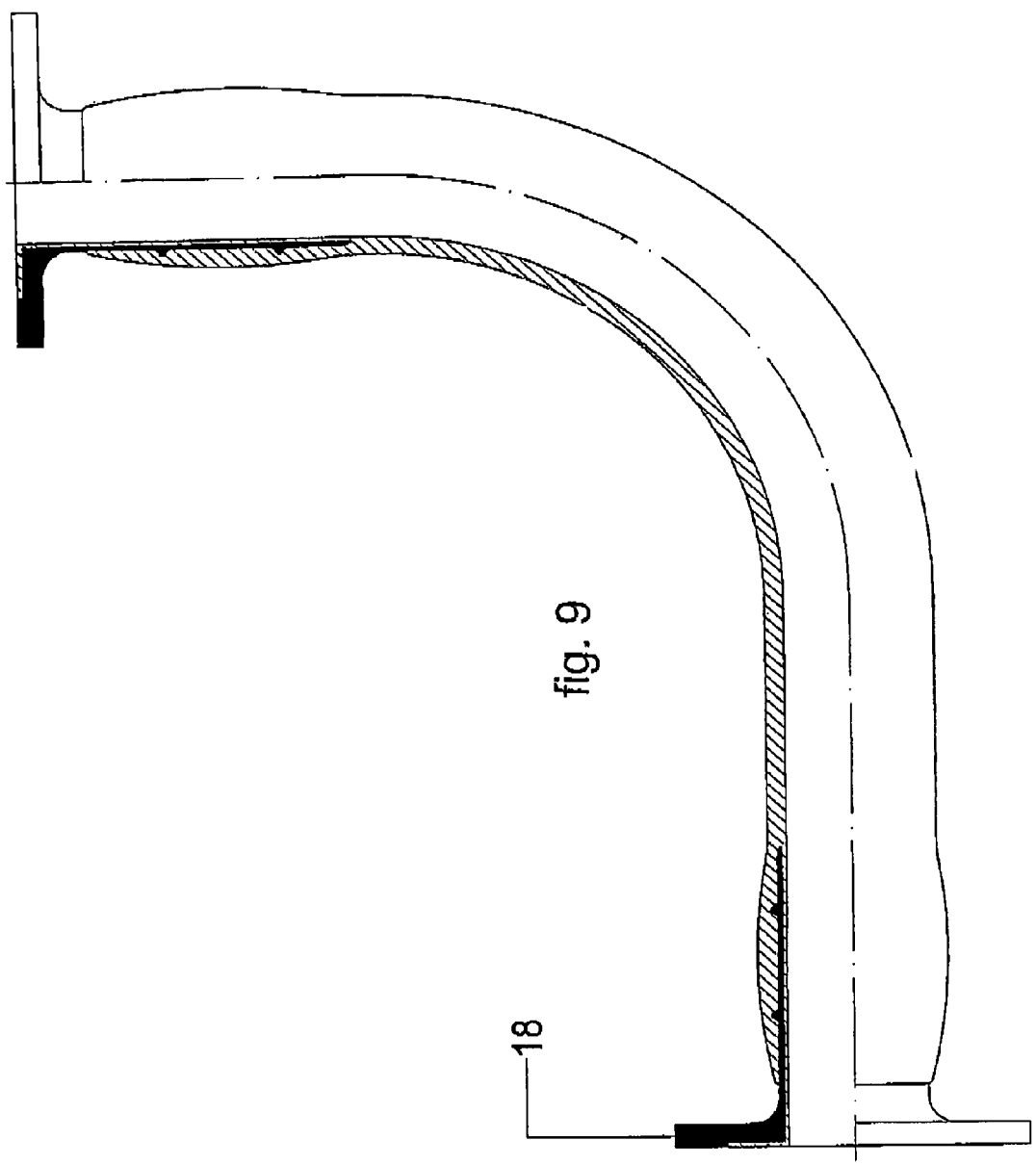
Figure 10:
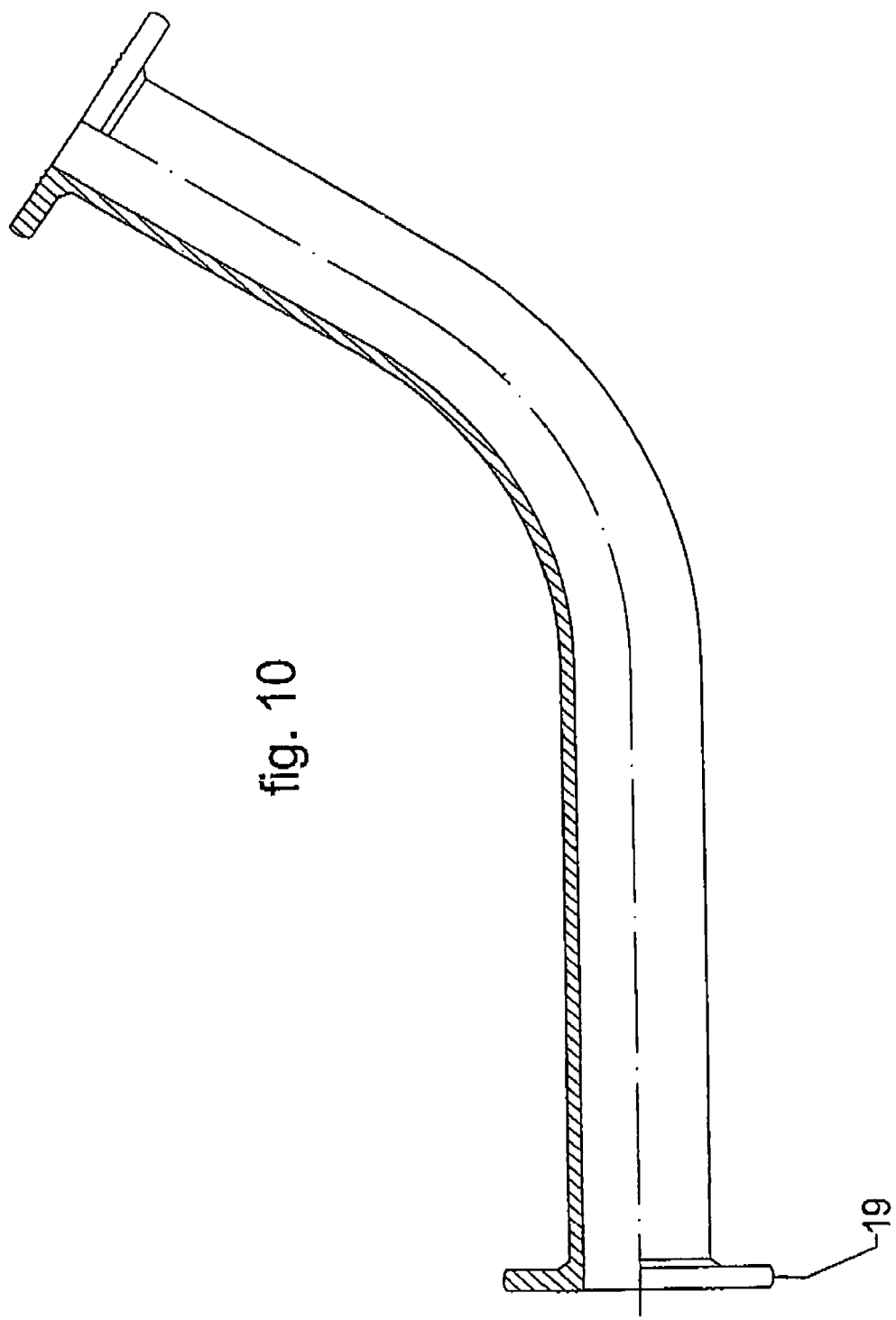
Figure 11:
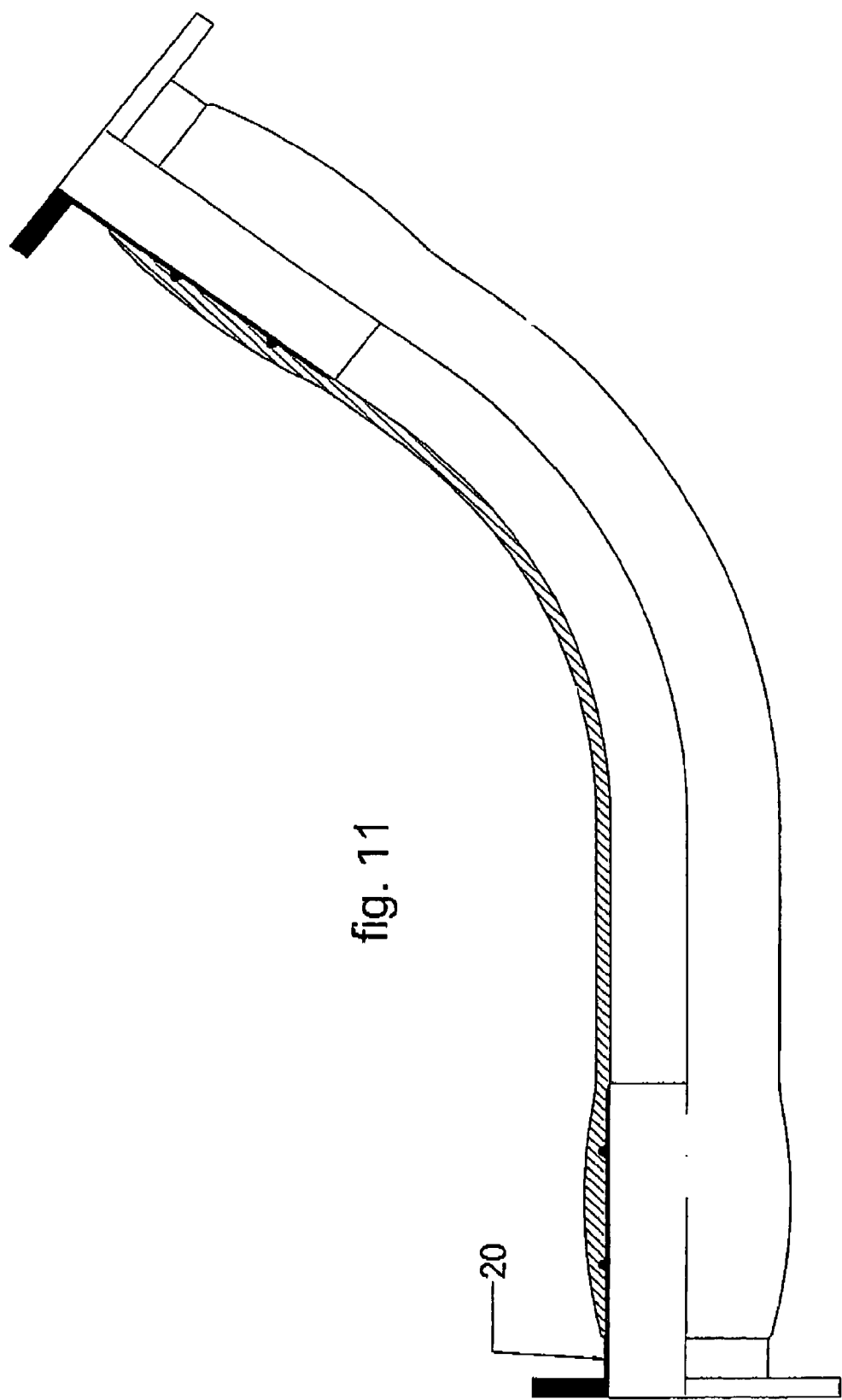

The Tube of FIG. 9
design size of the straight mandrel 13: outer diameter 130 mm:
flanges 3,4: coated cured fittings;
design size of the curved core 15: outer diameter 130 mm; bending radius 500 mm; angle 90°.

It should be apparent that the invention is not limited to the embodiments of the tube shown in the figures and hereinabove disclosed, since it is susceptible to several modifications and variations all of which will come within the scope of the invention.

The invention claimed is:

1. A method for making a shaped flexible tube, made of at least a curable material and provided with end portions assembled to the end portions of said shaped tube, characterized in that said method comprises the step of
   (a) twice curing said tube,
   (b) a first curing being carried out on the tube formed on a straight mandrel having a cylindrical shape,
   (c) a second curing being performed on a shaped cylindric core element, to provide the tube with a desired shape,
   (d) said fitting end portions being assembled as a single piece to the end portions of said shaped tube before said first curing is carried out.

2. A method according to claim 1, characterized in that said method comprises the steps of:
   forming said tube by winding, on a straight mandrel, at least a constructional curable material for said tube;
   subjecting said tube to a first curing, on a said straight mandrel;
   transferring the cured tube on a shaped cylindric core element;
   subjecting said tube on said shaped cylindric core to a second curing; and
   separating, from said shaped cylindric core, the curved tube made by said second curing.

* * * * *